United States Patent
Tang

(10) Patent No.: US 7,157,872 B1
(45) Date of Patent: Jan. 2, 2007

(54) CEILING FAN WITH OUTER-ROTOR DC BRUSHLESS MOTOR

(75) Inventor: Yung-Fu Tang, Taichung (TW)

(73) Assignee: Yong Shin T. Electric Machine Co., Ltd., Taichung (TW)

( * ) Notice: Subject to any disclaimer, the term of this patent is extended or adjusted under 35 U.S.C. 154(b) by 0 days.

(21) Appl. No.: 11/412,163

(22) Filed: Apr. 26, 2006

(51) Int. Cl.
*H02P 7/00* (2006.01)

(52) U.S. Cl. .................. 318/268; 318/432; 318/254

(58) Field of Classification Search .......... 318/254, 318/138, 439, 432, 434, 268; 417/410.1, 417/411
See application file for complete search history.

(56) References Cited

U.S. PATENT DOCUMENTS

| | | | | |
|---|---|---|---|---|
| 4,730,981 A | * | 3/1988 | Kawai | 416/83 |
| 4,900,236 A | * | 2/1990 | Kapaan | 417/354 |
| 5,462,407 A | * | 10/1995 | Calvo | 416/132 A |
| 6,095,767 A | * | 8/2000 | Caughey | 417/411 |
| 6,719,533 B1 | * | 4/2004 | Bird | 416/210 R |
| 2002/0021891 A1 | * | 2/2002 | Reiker | 392/364 |
| 2005/0100463 A1 | * | 5/2005 | Gajewski et al. | 417/424.1 |

* cited by examiner

*Primary Examiner*—Rina Duda
(74) *Attorney, Agent, or Firm*—Alan D. Kamrath; Nikolai & Mersereau, P.A.

(57) ABSTRACT

A ceiling fan with an outer-rotor type DC brushless motor has a center base with multiple blades and a DC brushless motor as a driving source for the fan. The DC brushless motor includes a controller, magnetism sensors, a stator with stator windings and a rotor assembly connected to the fan and having permanent magnets interacting with the stator windings. The controller detects polarity of the permanent magnets through the magnetism sensors. Based on the detected results, the controller changes current of the stator windings to produce an inductive magnetic field with poles the same to the permanent magnets to drive the rotor assembly. Accordingly, the blades of the fan are driven to rotate.

2 Claims, 3 Drawing Sheets

CEILING FAN WITH OUTER-ROTOR DC BRUSHLESS MOTOR

BACKGROUND OF THE INVENTION

1. Field of the Invention

The present invention relates to a ceiling fan, and more particularly to a ceiling fan that uses an outer-rotor type direct current brushless motor as a driving source.

2. Description of Related Art

DC motors are widely mounted in ceiling fans as driving sources to drive blades. The DC motor comprises a rotor with a permanent magnet, a stator with multiple coils, brushes and a commutator. As the rotor rotates, the brushes contact the commutator to conduct external DC power to the coils of the stator. The coils accordingly produce a magnetic field that repels the permanent magnet to drive the rotor to rotate in a particular direction.

With the high frequent contact and separation, the surfaces of both the brushes and the commutator easily have abrasion to cause sparks when the brushes separate from the commutator. The sparks may further affect other electronic components in the motor, i.e. the electromagnetic interference problem. Therefore, for the ceiling fans using the foregoing DC motor as the driving source, the possibility of malfunction is reasonable high.

Therefore, the present invention provides a new ceiling fan with an outer-rotor type DC brushless motor to overcome the forgoing mentioned drawbacks.

SUMMARY OF THE INVENTION

The objective of the present invention is to provide a ceiling fan with an outer-rotor type DC brushless motor that includes a stator and a rotor assembly, wherein the relative interactions between stator and the rotor assembly have no direct contact.

The ceiling fan has a center base with multiple blades radially connected to a center base. An outer-rotor type DC brushless motor is mounted on the center base to drive the blades. The DC brushless motor includes a controller, multiple magnetism sensors, a stator with stator windings and a rotor assembly mounted on the center base. The rotor assembly has permanent magnets interacting with the stator windings. The controller detects polarity of the permanent magnets through the magnetism sensors. Based on the detected results of the magnetism, the controller changes current of the stator windings to produce an inductive magnetic field with poles the same to the permanent magnets to drive the rotor assembly. Accordingly, the blades of the fan are driven to rotate.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
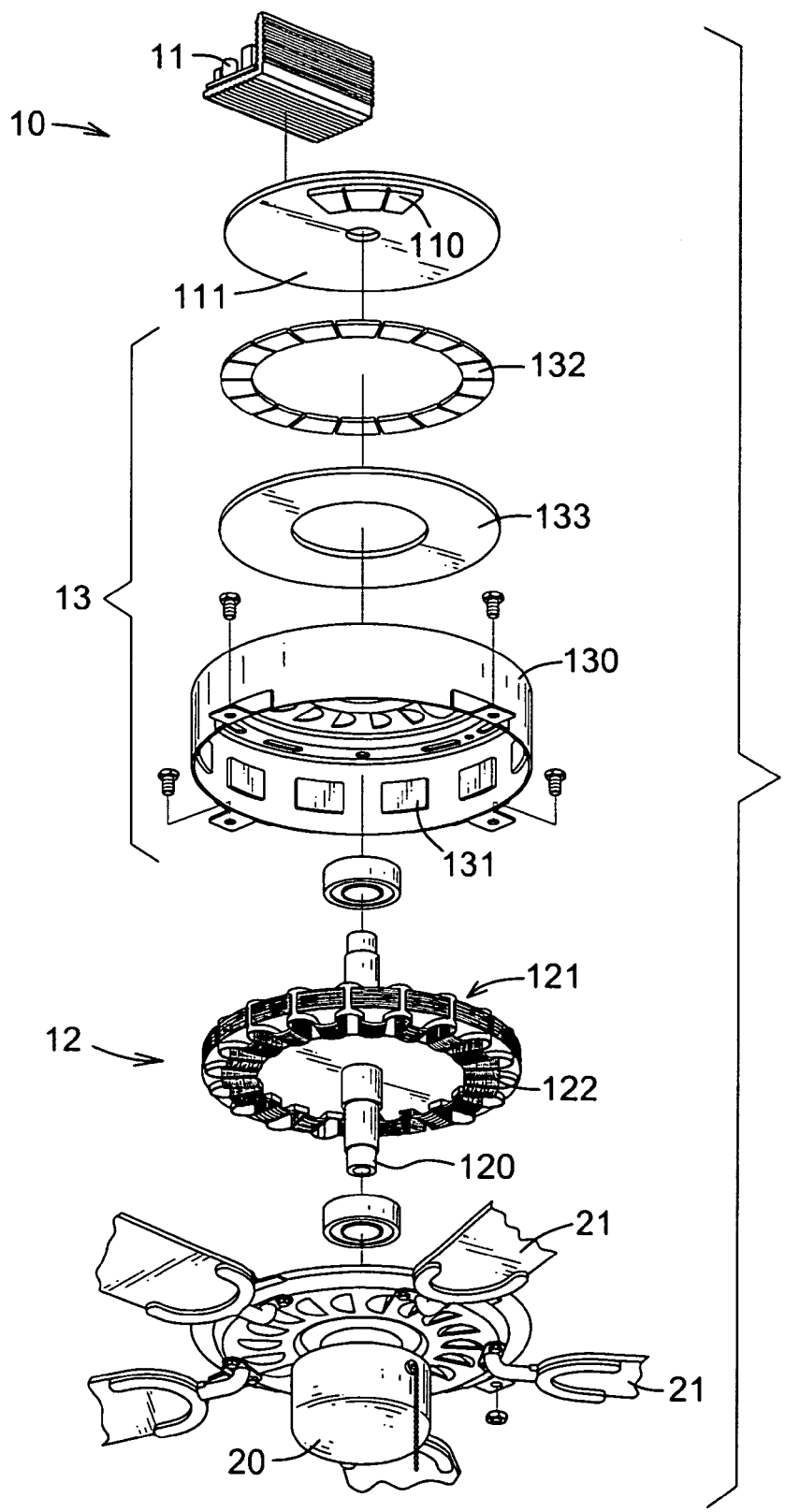
FIG. 1 is an exploded perspective view of a ceiling fan with an outer-rotor type DC brushless motor in accordance with the present invention.
Figure 2:
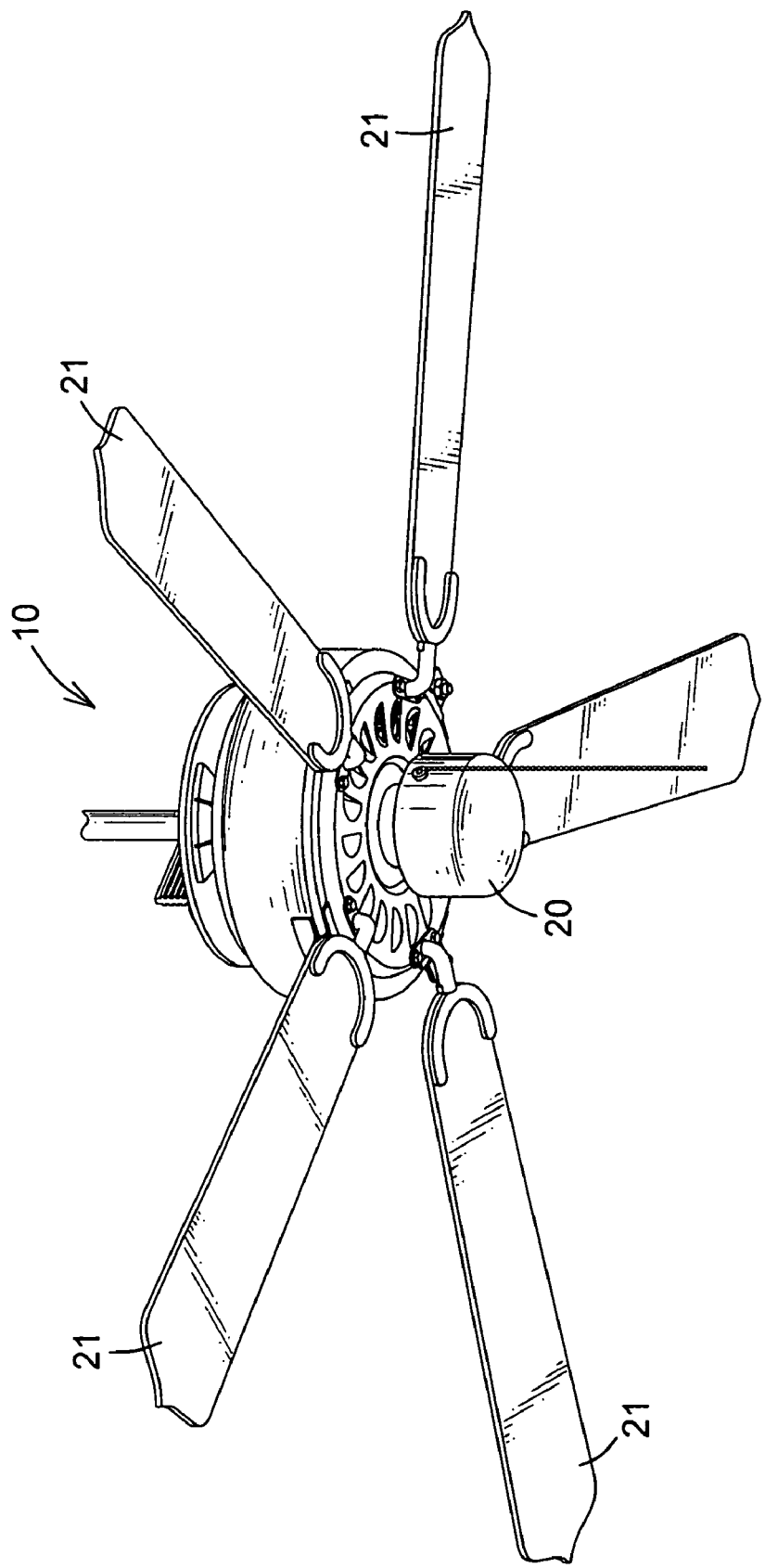
FIG. 2 is a perspective view of the ceiling fan of FIG. 1 in accordance with the present invention.
Figure 3:
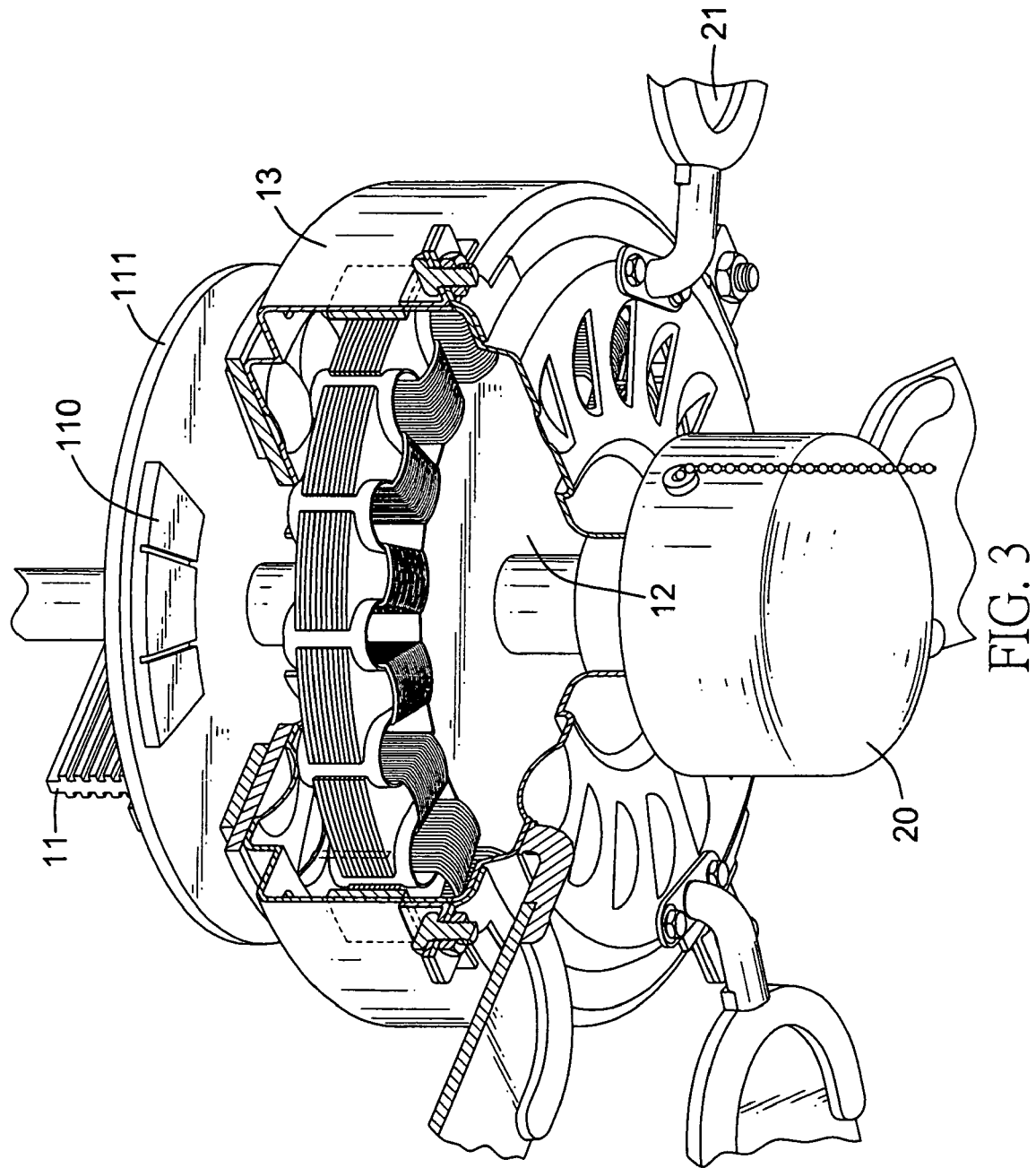
FIG. 3 is a partial cross sectional and perspective view of the ceiling fan in part in accordance with the present invention.

With reference to FIGS. 1 to 3, a ceiling fan in accordance with the present invention comprises a center base (20) with multiple blades (21) radially extending from the center base (20) and an outer-rotor type DC brushless motor (10) mounted on the center base (20).

The DC brushless motor (10) has a controller (11), a stator (12) and a rotor assembly (13) connected to the blades (21) of the fan (20). The stator (12) is formed by a circular flat body with a periphery and has an axis (120) extending through the circular flat body. Multiple slots (121) are defined through the stator (12) along the periphery so that stator windings (122) can be winded in the slots (121). In this embodiment, the stator (12) has eighteen stator windings (122) divided into three separate groups to be connected to the controller (11).

The rotor assembly (13) mounted on the axis (120) of the stator (12) includes a circular hub (130) with a top and an inner periphery, multiple permanent magnets (131) mounted on the inner periphery of the circular hub (13) and separated from each other with a distance, a pad (133) with multiple induction magnets (132) mounted on the top of the hub (130), wherein the induction magnets (132) are arranged in a circular shape on the pad (133). The number of the induction magnets (132) is eighteen and the number of the permanent magnets (131) is twelve.

A lid (111) having a top surface and a bottom surface is mounted on the rotor assembly (13). The controller (11) is mounted on the top surface of the lid (111) and connects to magnetism sensors (110) mounted on the bottom surface of the lid (111).

The controller (11) can detect the polarity of the permanent magnet (131) that is just below the magnetism sensors (110) through the induction magnets (132). Based on the detected results of the induction magnets (132), the controller (11) changes the current flowing through the stator windings (122) to produce an inductive magnetic field with poles the same to the permanent magnets (131). Since the inductive magnetic filed and the permanent magnets (131) have the same poles, the rotor assembly (13) is driven to rotate by the repelling force. As the rotor assembly (13) rotates, the magnetism sensors (110) continuously detect the variation of the polarity of the permanent magnets (131) so that the controller (11) can accordingly change the poles of the inductive magnetic field to keep the rotor assembly (13) rotating.

Based on the foregoing description, since the ceiling fan uses the outer-rotor type DC brushless motor as its driving source, the drawbacks of the conventional DC motors such as sparks, loud noises and abrasion between electrical components can be overcome.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A ceiling fan with an outer-rotor type DC brushless motor, comprising:
   a center base with multiple blades; and an outer-rotor type DC brushless motor as a driving source for the ceiling fan, wherein the outer-rotor type DC brushless motor mounted on the center base and comprises:
- a stator having an axis and multiple stator windings;
- a rotor assembly rotatably mounted on the axis of the stator and comprising:
  - a hub mounted on the center base having a top and an inner periphery;
  - multiple permanent magnets mounted on the inner periphery and interacting with the stator windings of he stator; and
  - a pad with multiple induction magnets mounted on the top of the hub; and
- a controller connects to magnetism sensors that are in a position above the induction magnets, wherein the controller detects polarity of the permanent magnet that is below the magnetism sensors through the induction magnets, and based on detected results, the controller accordingly changes current of the stator windings to produce an inductive magnetic field with poles the same to the permanent magnets to drive the rotor assembly and the blades.

2. The ceiling fan with an outer-rotor type DC brushless motor as claimed in claim 1, the outer-rotor type DC brushless motor further comprising a lid with a top surface and a bottom surface, wherein the controller and the magnetism sensors are respectively mounted on the top and the bottom surfaces of the lid.

* * * * *